Sept. 25, 1956 R. Z. HAGUE 2,764,022
REGISTER DRIVE MECHANISM FOR COMPOUND FLUID METERS
Filed Oct. 25, 1950 3 Sheets-Sheet 2

INVENTOR
ROBERT Z. HAGUE
BY Strauch, Nolan & Diggins
ATTORNEYS

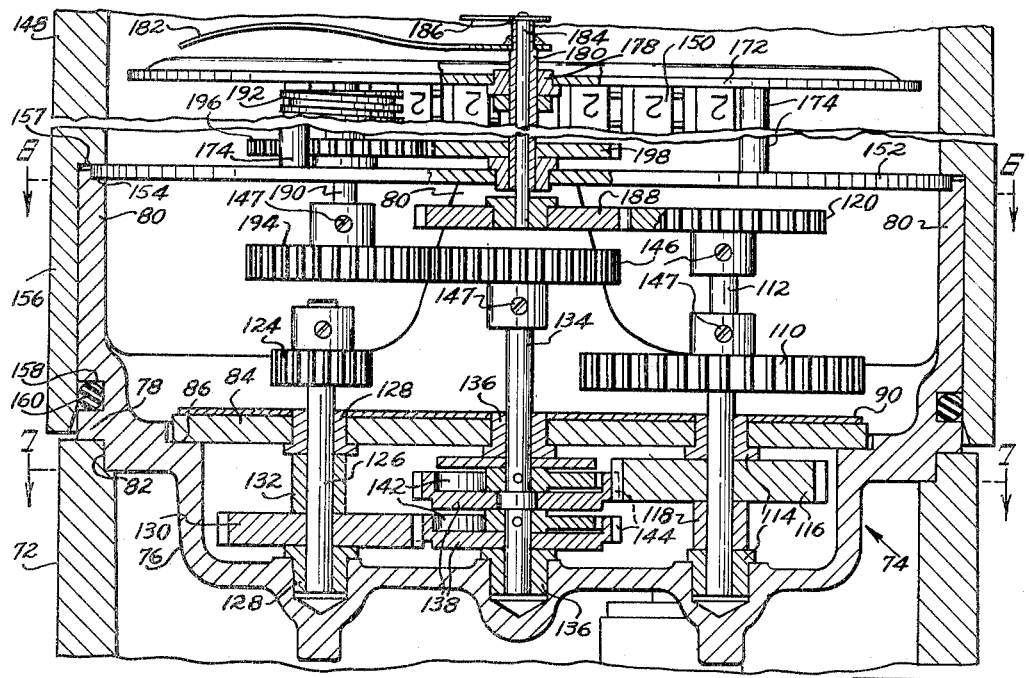
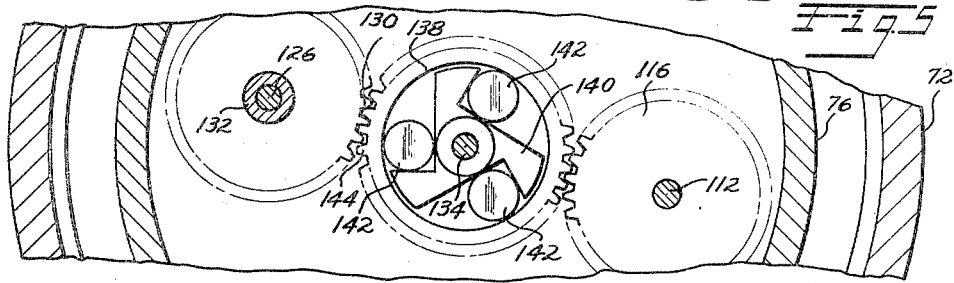
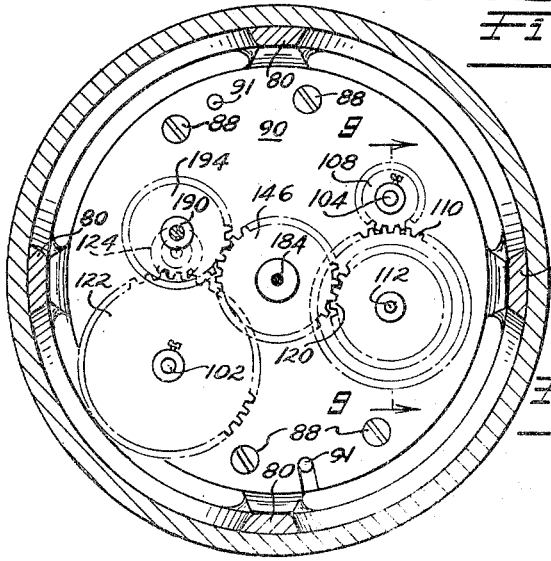
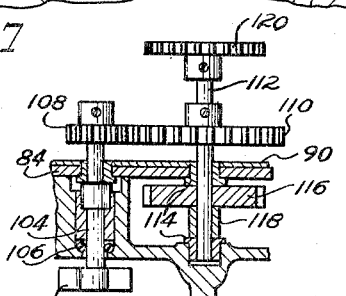

United States Patent Office 2,764,022
Patented Sept. 25, 1956

2,764,022

REGISTER DRIVE MECHANISM FOR COMPOUND FLUID METERS

Robert Z. Hague, Oradell, N. J., assignor to Rockwell Manufacturing Company, Pittsburgh, Pa., a corporation of Pennsylvania Application October 25, 1950, Serial No. 192,025

12 Claims. (Cl. 73—197)

This invention relates to compound fluid meters and has for its general object and purpose to provide certain improvements in the fluid meter of this type disclosed in United States Patent No. 2,425,720, issued August 19, 1947, embodying a novel construction and assembly of the several cooperating units, whereby maximum operating efficiency will be assured with minimum maintenance expense.

Another object is to provide means, in addition to the usual register device, for indicating the operative condition of small and large flow metering units and the quantity of water or other liquid passing through the meter outlet valve at any time.

A further object of the invention resides in the provision of a coordinator unit of novel construction having a housing for the coordinator mechanism and means for establishing a fluid tight seal between said housing and the box or housing for the register and indicating unit, whereby surface water and foreign matter will be excluded from the coordinator housing and an intermediate compartment containing changeable gears operatively connecting the coordinator with the register and indicator.

An additional object is to provide an arrangement of spaced supports for the register on the coordinator housing which are enclosed by a skirt on the register box wall forming a compartment for the changeable gears so that by removal of the register box the operation of said gears may be inspected and checked while the meter is in operation.

It is also one of the detailed objects of the invention to provide an indicator having a dial calibrated in units of measurement of fluid flow with long and short indicator hands movable over said dial, together with means drivingly connecting the long hand with the coordinator mechanism and means drivingly connecting the short indicator hand with the small flow metering unit independently of the coordinator mechanism.

Finally, it is the aim and purpose of the present invention to provide a compound fluid meter as above characterized of inexpensive and durable construction, in which the several cooperating elements are of simple structural form and may be easily and rapidly assembled to form a completely sealed accurately functioning meter of this class.

With the above and other objects in view, the invention comprises the improved compound fluid meter and the construction and relative arrangement of its several parts, as will hereinafter be more fully described, illustrated in the accompanying drawing and subsequently incorporated in the sub-joined claims.

In the drawings, wherein I have disclosed one simple and practical embodiment of the present improvements and in which similar reference characters designate corresponding parts throughout the several views:

Figure 5 is a vertical sectional view on an enlarged scale of the coordinator unit and register box assembly showing the drive gearing for the register and indicator hands;

Figure 6 is a horizontal section on a reduced scale taken substantially on the lines 6—6 of Figure 5;

Figure 7 is a fragmentary horizontal section taken on the lines 7—7 of Figure 5;

Figure 8 is a fragmentary plan view of the top or cover section of the meter casing, the coordinator and register assembly being removed;

Figure 9 is a detail vertical section taken substantially on the lines 9—9 of Figure 6;

Figure 10 is a similar detail section taken substantially on the lines 10—10 of Figure 8, and Figuring 11 is a fragmentary vertical section showing the means for locating the coordinator unit on the top section of the meter casing and means for detachably connecting the register box with said casing section.

Figure 1:
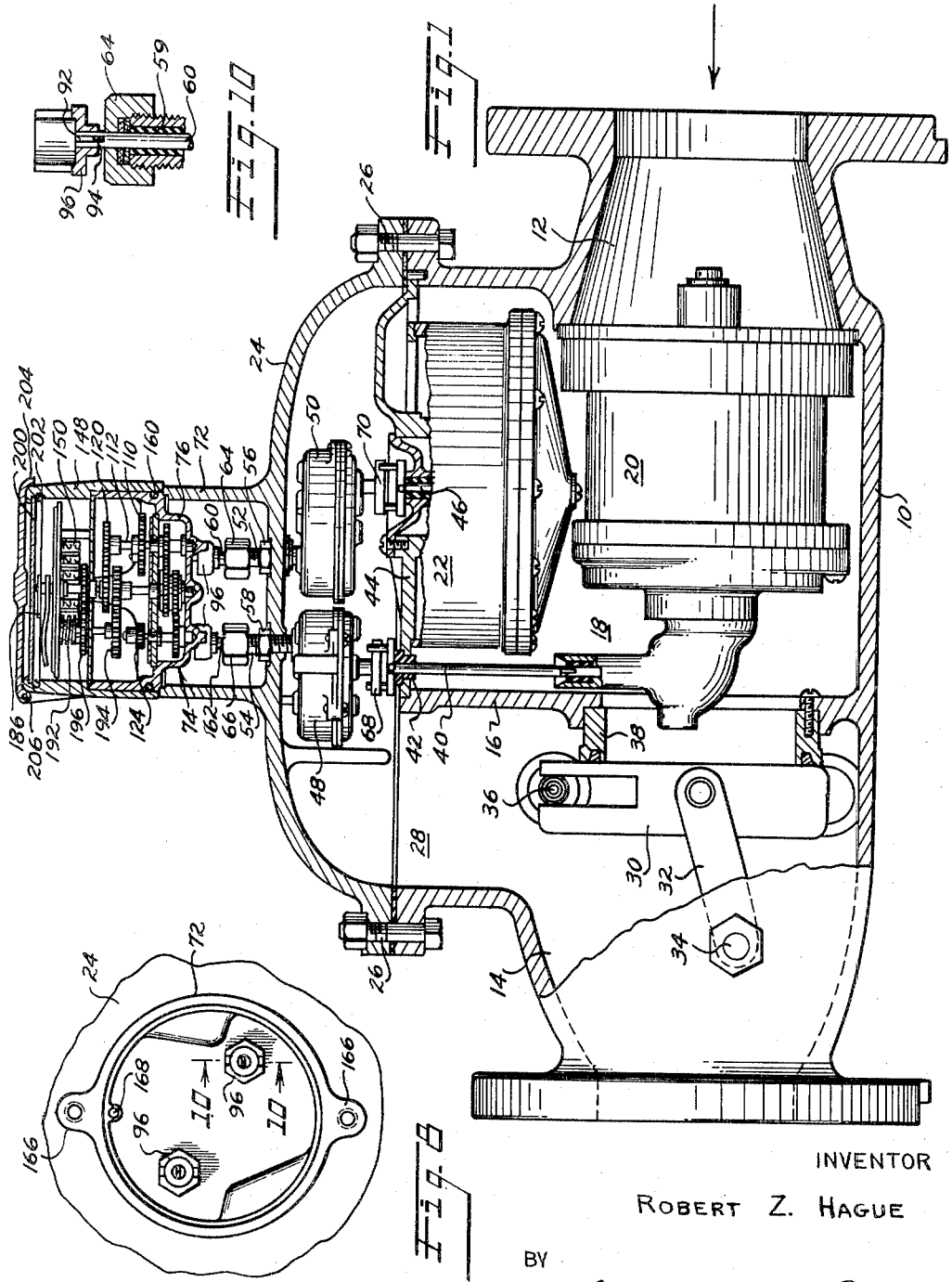
Figure 1 is a vertical longitudinal sectional view of a compound meter showing the coordinator unit and combined register and indicator unit in assembled position upon the top or cover section of the meter casing.
Figure 2:
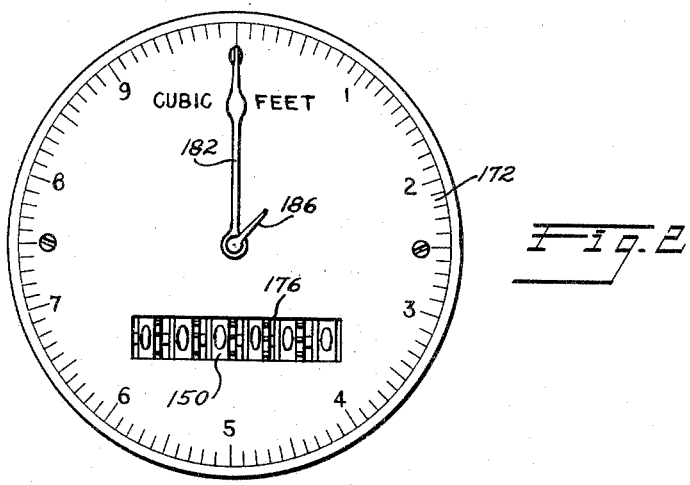
Figure 2 is a plan view of the indicator and register, the box or housing therefor being omitted.
Figure 4:
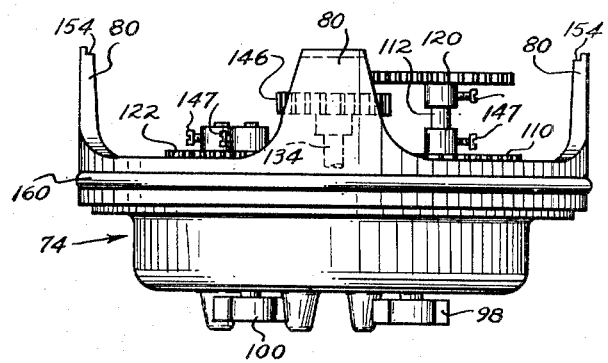
Figure 4 is a side elevation of the coordinator unit.
Figure 3:
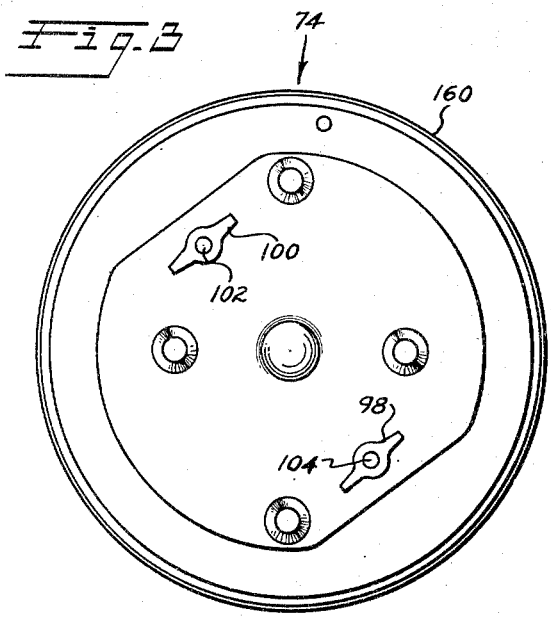
Figure 3 is a bottom plan view of the coordinator unit.

Referring in further detail to the drawings, the casing body 10 is formed with the axially aligned inlet and outlet passages 12 and 14 respectively. An internal vertically extending wall 16 separates the outlet passageway 14 from the chamber 18 in which a large flow metering unit 20 of the rotary impeller type is mounted in co-axial relation with the passageways 12 and 14 and a small flow metering unit 22 of the positive displacement oscillating piston type is mounted above the metering unit 20.

The top or cover section 24 of the casing body is removably bolted to the casing body walls as indicated at 26 and is of generally dome shape form, the wall of said cover section extending above and over the small flow metering unit 22 and the upper open end of the vertical extension 28 of the outlet passageway 14 which is formed between the wall 16 and the adjacent end wall of the casing body. Through this extension of passageway 14, fluid passing through the small flow metering unit 22 is by-passed around the outlet valve 30. This valve is pivotally supported at opposite sides thereof upon one end of supporting members indicated at 32, the other ends of which are pivotally mounted as at 34 between the side walls of the outlet passage 14.

Valve 30 at its upper end has sliding pivotal movement upon a fixed guide rod 36 and the weight of the valve causes members 32 to normally urge the inner side face of the valve into close sealing contact against the outer end face of the valve seat member 38 to close the outlet passage therethrough from chamber 18. This valve seat member is suitably mounted upon the wall 16 in concentric relation to the opening therein.

The impeller of the large flow meter 20, through suitable intermediate gearing, drives the vertical shaft 40 which is journalled at its upper end in a hard rubber bushing 42 mounted in a flange extension of the top section 44 of the small flow meter 22 supported on the walls of the casing body 10 enclosing the upper end of chamber 18. The shaft 40 is located at one side of the metering unit 22 and is in suitably spaced relation from the spindle 46 driven by the oscillating piston of said metering unit.

Suitable speed reduction gearing is contained within each of the housings 48 and 50 mounted within cover member 24 by means of the hollow externally threaded members 52 and 54 fixed at their lower ends to the respective housings 48 and 50 and extending upwardly therefrom through openings in the top wall of the cover 24. Above said wall the nuts 56 and 58 are threaded on to the members 52 and 54 which provide means for retaining the housings in fixed relation to the top wall of cover 24. Each of the members 52 and 54 receives packing material as indicated at 59 in Figure 10 of drawings, thereby providing stuffing boxes for the final shafts 60 and 62 respectively of the speed reduction units which extend above the packing adjusting nuts 64 and 66 threaded upon the upper ends of numbers 52 and 54.

The first shaft of the reducing gear train in housing 48 is drivingly coupled as at 68 with the upper end of shaft 40 driven by the large flow metering unit 20, while the first shaft of the reducing gear train in housing 50 is similarly coupled as at 70 with the spindle 46 of the small flow metering unit 22. To the extent above described, the present disclosure is substantially the same as that contained in the above mentioned Patent No. 2,425,720.

The upper ends of the members 52 and 54 and shafts 60 and 62 are enclosed within a vertical cylindrical extension 72 integrally formed with the wall of the cover section 24. On the upper end of this cover extension, the coordinator unit generally indicated at 74 is mounted. This unit includes a housing 76 for the coordinator mechanism, the wall of said housing at its upper end being formed with an outwardly off-set annular flange 78 having a plurality of circumferentially spaced integrally formed upwardly projecting supporting arms 80 for the register to be presently described.

The upper end of the cylindrical extension 72 of cover 24 and flange 78 of the coordinator housing 76 are formed with interfitting mating shoulders, as at 82, which provide an accurate mounting and support for the coordinating unit in concentric relation with the cylindrical extension 72.

The top of the coordinator housing 76 is closed by top plate 84 seated upon the shoulder 86 on the housing wall and secured thereto by screws 88, as shown in Figure 6, which also secure a thin sheet metal disk 90 upon the top surface of said plate, both plate 84 and disc 90 being properly positioned on housing 76 by the locating pins 91 which are fixed to housing 76 and project upwardly through suitable apertures in the plate and disc. This disc may carry suitable inscriptions identifying the gear trains with the large and small metering units 20 and 22 respectively.

The upper end of each shaft 60 and 62 is provided with a longitudinal slot 92 to receive a key 94 in the hub portion of a coupling member 96 whereby the coupling member may be non-rotatably and removably connected with the shaft. These coupling members are of tubular form, the cylindrical walls thereof being slotted to receive the opposite end portions of lugs 98 and 100 respectively on the lower ends of vertical shafts 104 and 102 which are mounted in suitable bearings provided in the top plate 84 of the coordinator housing and are surrounded by sealing rings 106. Thus surface water leaking through the stuffing boxes cannot enter the sealed coordinator unit.

Shaft 104 which is drivingly coupled with the small flow metering unit 22 is provided on its upper end with spur gear element 108 in mesh with the similar element 110 fixed to a shaft 112 journalled in suitable bearings 114 mounted in the bottom wall of the housing 76 and the top plate 84 thereof. A spur gear 116 is fixed on shaft 112 between the upper bearing 114 and spacer sleeve 118 interposed between said gear and the lower bearing 114. To the upper end of shaft 112 above gear 110, a gear 120 is secured. The function and purpose of gear elements 116 and 120 will be presently described.

On the upper end of the vertical shaft 102 drivingly coupled to the large flow metering unit 20, the gear 122 is fixed in mesh with a gear element 124 fixed to the upper end of vertical shaft 126 journalled in spaced bearings 128 in the bottom wall of coordinator housing 76 and top plate 84 thereof. A gear 130 fixed to this shaft within the housing is spaced from the upper bearing 128 by the spacer sleeve 132.

The register drive shaft 134 is journalled in the central upper and lower bearings 136 in the bottom wall of the coordinator housing 76 and top plate 84 and within said housing two over-running clutch units of the dog and roller type are assembled on shaft 134. Each of these units includes a clutch housing 138 within which a multi-armed clutch dog 140 is fixed on the shaft 134, clutch rollers 142 being rotatably and slidably retained between the arms of said dog and the cylindrical wall of the clutch housing. Each clutch housing has spur gear teeth 144 externally formed upon the wall thereof. This assembly of the over-running clutch units is substantially similar to that shown in the copending application of Charles P. Bergman, Serial No. 14,178, filed March 11, 1948, the notable difference being that in the present case, a much closer assembly of the two clutch units is obtained by elimination of the separate drive gears fixed on the hub portions of the clutch housing as shown in the pending application.

Upon the upper end of shaft 134, a spur gear 146 is secured. Preferably, all of the gear elements above the coordinator housing and between the arms 80 thereon are secured to the respective shafts by means of suitable set screws indicated at 147 whereby they may be conveniently removed and replaced by others when it is necessary to change the gear ratios.

Figure 11:
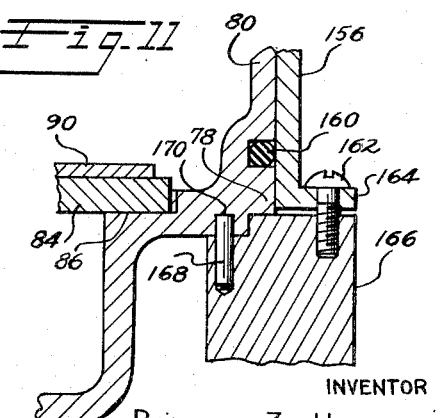

Within a register box 148, a register 150 of standard type is mounted upon a base plate 152, the marginal edge of which is received upon a supporting shoulder 154 formed on the upper end of each of the arms 80 carried by the coordinator housing 76. The wall of the register box 148 is formed with a lower skirt portion 156 of reduced thickness which has a sliding fit over the outer side faces of the arms 80, upon which the plate 152 of the register is tightly clamped by shoulder 157. The flange 78 of the coordinator housing 76 is provided with an external annular groove 158 in which a sealing O-ring 160 of rubber or other compressible material is fitted. Thus when the register box 148 is assembled upon the supporting arms 80, the skirt portion 156 of the box wall will tightly compress the sealing ring and thereby effectively exclude the entrance of water to the gear compartment formed by the skirt 156 between the spaced supporting arms 80. The register box and the coordinator unit are rigidly held in assembled relation by means of diametrically opposite screws 162 extending through apertured lugs 164 formed on the lower end of skirt 156 of the register box and threaded into bores in the upper ends of ribs or bosses 166 externally formed on the cylindrical extension 72 of the cover member 24. As shown in Figure 11, an internal projection is also formed on the extension 72 in which dowel pin 168 is secured. The upper end of this dowel pin is received in a cylindrical bore or socket 170 formed in the bottom face of the offset flange 78 on the coordinator housing to accurately locate the coordinator unit whereby the driving dogs 98 and 100 will be properly coupled with the members 96 on the upper ends of the output shafts 60 and 62 of the reducing gear trains in housings 48 and 50.

A dial plate 172 is supported above and in parallel relation to the base plate 152 by connecting posts 174, the dial plate being calibrated in units of cubic feet of fluid flow or other selected terms of measurement. This plate is provided with a slot or opening 176 through which the digit wheels of the register 150 are visible.

Suitable bearings 178 are centrally mounted in the base plate 152 and dial plate 172, and in these bearings a hollow shaft 180 is journalled. To the upper end of this shaft, a long indicator hand 182 is fixed at one end and extends radially over the face of dial plate 172. A second shaft 184 extends through and is rotatable relative to the hollow shaft 180 and to the upper end of this internal shaft 184, a small indicator hand 186 is secured which projects radially only a short distance over the face of the dial plate 172.

To the lower end of the operating shaft 184 for the short indicator hand 186, a gear 188 is fixed and is in constant mesh with the gear 120 on the upper end of shaft 112.

In laterally spaced relation from the indicator operating shafts 180 and 184, a vertical shaft 190 is journalled in suitable bearing means on the base plate 152 and dial plate 172, the upper end of said shaft being drivingly connected by suitable means with the register 150, such as the worm gearing indicated at 192. To the lower end of this shaft 190, a gear 194 is fixed and is in mesh with the gear 146 on the upper end of register drive shaft 134. Above the base plate 152, a gear 196 is fixed on shaft 190 and is meshed with a similar gear 198 fixed to the hollow shaft 180 to the upper end of which the long indicating hand 182 is attached.

From reference to Figure 5, it will be noted that the gear 130 on shaft 126 within the indicator housing is in mesh with the peripheral teeth 144 on the housing 138 of the lower over-running clutch unit. Since shaft 126 is drivingly connected with the large flow metering unit 20, it will be apparent that motion is transmitted through the coordinator mechanism and the above described gearing to the large indicator hand 182 at a speed proportionate to the rate of flow of the fluid through the large metering unit.

Gear 116 on shaft 112 is in constant mesh with the teeth on housing 138 of the upper over running clutch unit, said shaft 112 being drivingly connected with the small meter. Shaft 112, however, is connected by gearing 120 and 188 with shaft 184 which operates the short indicating hand 186 so that the latter indicating hand is directly driven from shaft 112 and not through the coordinating mechanism.

Above the indicator hands, a glass protecting disk 200 is mounted in the wall of the register box 148, said glass disk 200 being secured in fluid tight relation with the wall of the box by means of retaining ring 202. A metal cover 204 is hinged to the box wall at one side, thereof, as at 206, and in its normal closed position extends over the glass 200 to prevent breakage thereof and exclude the entrance of water and dirt.

From the above description, the operation of the apparatus will be readily understood. Fluid entering through the inlet 12, rotates the impeller of the large metering unit 20, thereby driving the shaft 40, which in turn through the reduction gearing in housing 48, shaft 102, and gears 122 and 124 drives shaft 126 to rotate the housing 138 of the lower clutch unit and transmit rotation through shaft 134 and gears 146 and 194 to the operating shaft 190 for the meter register 150. However, the metering unit 20 cannot accurately measure a small fluid flow and during such flow valve 30 remains in its closed position, the fluid from meter 20 passing upwardly and through the small metering unit 22, oscillating the piston therein to drive shaft 112 through the reduction gearing in housing 50, shaft 104 and gears 108 and 110 and thus rotate the housing 138 of the upper clutch unit and shaft 134 at a higher speed of rotation than the lower clutch housing 138 which is driven by the large metering unit 20. Since the drive between the shafts 126 and 134 is thus over-run by the drive between shafts 112 and 134, the former drive has no effect on the register which is driven by the more rapidly rotating of the two shafts 112 and 126.

When the volume of fluid entering through the passageway 12 increases to such an extent that the metering unit 20 can accurately measure the flow, but still below the maximum capacity of the small meter 22 there is still insufficient pressure differential between chamber 18 and passage 14 to unseat the valve 30, the two clutch housings 138 will then be driven by the respective metering units at substantially the same speeds, but in the event of any slight differences, the register will be operated by the faster rotating clutch housing. Upon a further increase in the entering volume of fluid, as meter unit 20 continues to accurately measure the flow on register 150, valve 30 will then be swung outwardly and upwardly to its open position, such opening movement of the valve being governed by the fluid pressure differential between chamber 18 and passage 14 created by the fluid flow through the small metering unit 22, as disclosed in the above mentioned patent. With the valve 30 in open position, the fluid discharged from meter unit 20 will mainly pass directly therefrom into the outlet passage 14. Thus the small meter unit 22 will not be driven at an excessive speed which might damage it and its connections to the register.

The large flow meter 20 now exclusively controls the translation of large volume fluid flow between the inlet and outlet passages in terms of units of measurement to the register device 150. Thus, the coordinator assembly above described automatically selectively establishes a driving relationship between the register device and the respective large and small flow fluid metering units so that the fluid flows in variable volume through the meter housing will always be accurately registered. Of course, the gear ratios used in the coordinator assembly for driving the respective housings are accurately calculated in accordance with the known capacities of the respective metering units.

During low fluid flows, motion will be transmitted from the respective metering units to the indicator hands 182 and 186 at substantially the same rate of speed, thus indicating that the register device is being operated from the small flow meter. Shortly before the valve 30 starts to open and as the fluid pressure in chamber 18 increases, the large flow meter 20 through the coordinator mechanism assumes operative control of the register 150 and as the valve 30 opens, fluid flow through the metering unit 22 decreases. As this metering unit is operatively connected with the small indicator hand 186 as above described, the movement of this hand over the dial plate 172 will lag behind the movement of the longer indicating hand 182. In other words, the latter indicating hand will move at a faster rate of speed than the small hand 186. However, movement of the latter indicating hand is an assurance that the small flow metering unit 22 is in operable condition.

It will thus be seen that the two indicator hands moving over the calibrations of the dial plate 172 will give a complete story of the meter operation. By noting the rate of flow at which the long indicator hand 182 moves away from the short hand 186, it may be determined at what rate of flow of the fluid into outlet passage 14, the valve 30 is opening. In other words, the quantity of water passing through the valve at any time is indicated by the rate of turning movement of the indicator hand 182 over the dial plate relative to the small indicator hand 186.

The coordinator unit and register box assembly above described permits easy access to the gear compartment by the removal of the register box, the spaced register supports 80 on the coordinator housing permitting the various gears to be inspected and checked while the meter is operating. Preferably all of the coordinator shafts are of stainless steel and mounted in Oilite bronze bushings. By the removal of the coordinator unit and register box assembly from assembled position upon the cover extension 72 of the meter, the coupling members 96 may be readily removed from the upper ends of the shafts 60 and 62 for the purpose of adjusting the shaft packings.

From the above description it will be seen that my present improvements provide a novel construction and assembly of the coordinator unit and register box with a complete fluid tight seal of the compartment containing the coordinator mechanism, change gears and register mechanism, together with novel means for indicating the rate of flow of the fluid through the meter whereby the utility and serviceability of compound meters of the type shown in the above mentioned issued patent is materially increased. Of course, it will be apparent that such improvements may also be readily adapted for use in connection with other compound meters having different relative arrangements of the two metering units and the outlet flow control valve.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a fluid flow meter, a casing containing an element responsive to fluid flow through the meter, a gear carrier having a fluid tight bottom removably seated upon said casing, a register mechanism support separate from said carrier removably mounted on said carrier, register mechanism on said support, said carrier having a continuous external peripheral side wall surface, a housing mounted above said gear carrier for enclosing said register mechanism, said housing being seated on said support and having a continuous internal peripheral side wall surface closely fitting about said external side wall surface of said carrier, coacting means at said surfaces sealing against passage of fluid between said surfaces so that a fluid tight compartment is provided enclosed by said housing and carrier, and means removably securing said register housing to said meter casing, said last-named means clamping said support between the register housing and the gear carrier and also tightly seating said carrier upon said meter casing.

2. In a fluid flow meter, a casing containing an element responsive to fluid flow through the meter, a gear carrier having a fluid tight bottom removaly seated upon said casing, a register mechanism support separate from said carrier removably mounted on said carrier, register mechanism mounted on said support, said carrier having a continuous external peripheral side wall surface, a housing mounted above said gear carrier for enclosing said register mechanism, said housing being seated on said support and having a continuous internal peripheral side wall surface closely fitting about said external side wall surface of said carrier, there being a continuous groove in one of said surfaces, an annulus of compressible material of circular cross section when relaxed and disposed in said groove deformed by the interfitting of said surfaces to seal against passage of fluid between said surfaces and means removably securing said register housing to said meter casing, said means clamping said support between the register housing and the gear carrier and also tightly seating said gear carrier upon said meter casing.

3. In a fluid flow meter, a casing containing an element responsive to fluid flow through the meter, a top wall on said casing, a hollow boss upstanding from said wall, an upwardly facing internal shoulder on said wall, a gear carrier having a fluid tight bottom seated upon said shoulder and closing the top of said boss, said carrier having a continuous external peripheral side wall surface and open side wall regions above said surface, a register mechanism support plate seated on the upper part of said carrier, a register mechanism housing mounted above said gear carrier and having an internal shoulder seated on said plate, means removably securing said housing to said boss so that said plate is clamped between said housing and said carrier, said register mechanism housing having a continuous internal peripheral side wall surface enclosing said side wall regions of said carrier and surrounding said external side wall surface of said carrier, there being a continuous groove in said carrier side wall surface, and an annulus of compressible material in said groove deformed by the interfitting of said surfaces to seal against passage of fluid between said surfaces.

4. In a fluid flow meter assembly, a casing containing an element responsive to fluid flow through the meter, a gear carrier removably seated on said casing, said carrier having a continuous external peripheral side wall surface about its lower end just above said casing and a plurality of circumferentially spaced arms upstanding from said lower end, a register mechanism support separate from said carrier removably seated on said gear carrier arms, register mechanism on said support, a housing seated on said support enclosing said mechanism and having a continuous internal peripheral side wall surface surrounding said arms and the external side wall surface of said carrier, means removably securing said housing to said casing thereby clamping said support between the housing and carrier, drive transmission gearing in the space surrounded by said carrier arms accessible upon removal of said housing, and coacting fluid tight sealing means between said wall surfaces in the assembly.

5. In the meter defined in claim 4, said drive transmission gearing comprising spaced shafts and meshed gear pairs on the respective shafts, with certain of said gear pairs being removably mounted on said shafts for replacement by different ratio gear pairs, said spaced arms permitting observation of the installed gear pairs immediately upon dismounting said housing.

6. In a meter, a casing, a gear carrier removably mounted upon said casing, circumferentially spaced upstanding arms on said carrier, a register mechanism mounting plate separate from the carrier and removably seated on said arms, register mechanism on said plate, a housing enclosing said mechanism and removably secured upon said casing with its lower end telescoped with said gear carrier, and means providing a fluid tight seal between said carrier and said lower end of the housing, said housing engaging said mounting plate in the assembly so that when said register housing is secured to said casing said mounting plate is clamped between said housing and carrier and held against rotation with respect thereto.

7. In a compound meter, a casing containing a low fluid flow responsive meter and a large fluid flow responsive meter, shafts independently drive-connected to the respective meters, an indicator comprising a dial and two hands independently rotatably mounted on a common axis and adapted to move over said dial, a third shaft drive-connected to one of said hands, separate overrunning clutch drives operatively connecting each of said low flow and large flow meter actuated shafts with said third shaft, and means independently connecting the other of said hands to be concomitantly directly driven by one of said meter actuated shafts.

8. In the compound meter defined in claim 7, said other hand being connected to be directly driven by the shaft that is actuated by the low flow meter.

9. In the meter defined in claim 7, said dial having an aperture and a counter drive-connected to said third shaft mounted below said dial so as to be visible through said aperture.

10. In a compound meter, a casing containing a low fluid flow responsive meter and a large fluid flow responsive meter, shafts independently drive-connected to the respective meters, an indicator comprising a dial and two hands independently rotatably mounted on a common axis and adapted to move over said dial, a third shaft coaxial with the common axis of said hands and drive-connected to one of said hands, separate overrunning clutch drives operatively connecting each of said low flow and large flow meter actuated shafts with said third shaft, and means independently connecting the other of said hands to be concomitantly directly driven by one of said meter actuated shafts.

11. In the compound meter defined in claim 10, said other hand being connected to be directly driven by the low flow meter actuated shaft.

12. In a compound meter assembly wherein large and small flow actuated meters are mounted within a casing traversed by line fluid and two rotatable shafts, one driven by each meter, project through fluid-tight fittings exteriorly of said casing, a meter drive coordinator unit comprising a housing having a sealed bottom peripherally and removably seated on said casing, a plate closing the top of said housing, and two rotatable input shafts projecting through and downwardly from said bottom, means on said housing bottom sealing it fluid tight where said input shafts project therethrough while permitting rotation of said input shafts, couplings detachably connecting each of said meter driven shafts to one of said input shafts, drive coordinating mechanism within said housing operatively connected to said input shafts and having an output shaft projecting upwardly through said plate, a plurality of circumferentially spaced vertical arms on said housing, a register mechanism support plate separate from said housing removably mounted on the upper ends of said arms, register mechanism mounted on said support plate, a register mechanism enclosing box mounted above said unit having an internal shoulder seated on said support plate and a depending skirt snugly surrounding said arms and bridging the spaces between said arms to provide an enclosed but accessible gear compartment between said unit and the register mechanism, means providing a peripheral fluid tight seal between the lower part of said skirt and the outer surface of said housing, means removably securing said skirt to said casing and holding said coordinator unit housing on its seat on the casing, said means also clamping said register mechanism support plate between the register box and said arms on the coordinator housing, and register drive gearing in said compartment operatively connected to said output shaft and said register mechanism.

References Cited in the file of this patent

UNITED STATES PATENTS

| | | |
|---|---|---|
| 675,145 | Tilden | May 28, 1901 |
| 699,228 | Parks | May 6, 1902 |
| 1,037,710 | Zimmerman | Sept. 3, 1912 |
| 1,073,386 | Bassett | Sept. 16, 1913 |
| 1,845,464 | Weymouth | Feb. 16, 1932 |
| 2,301,930 | Cattaneo | Nov. 17, 1942 |
| 2,329,604 | Ginter | Sept. 14, 1943 |
| 2,425,720 | Bergman | Aug. 19, 1947 |
| 2,566,220 | Lindley | Aug. 28, 1951 |
| 2,607,640 | Bergman | Aug. 19, 1952 |
| 2,627,747 | Miller | Feb. 10, 1953 |

FOREIGN PATENTS

| | | |
|---|---|---|
| 432,192 | Germany | July 29, 1926 |
| 534,974 | Germany | Oct. 5, 1931 |
| 614,871 | Great Britain | Dec. 23, 1948 |